(12) United States Patent
Asnis (10) Patent No.: US 10,127,371 B2
(45) Date of Patent: Nov. 13, 2018

(54) USER IDENTIFICATION BASED ON THE MOTION OF A DEVICE

(71) Applicant: Roku, Inc., Saratoga, CA (US)

(72) Inventor: Ilya Asnis, Saratoga, CA (US)

(73) Assignee: ROKU, INC., Los Gatos, CA (US)

( * ) Notice: Subject to any disclaimer, the term of this patent is extended or adjusted under 35 U.S.C. 154(b) by 72 days.

(21) Appl. No.: 14/966,576

(22) Filed: Dec. 11, 2015

(65) Prior Publication Data

US 2017/0169207 A1 Jun. 15, 2017

(51) Int. Cl.
| | |
|---|---|
| *G06F 21/35* | (2013.01) |
| *G06F 1/16* | (2006.01) |
| *G06F 3/01* | (2006.01) |
| *G06F 21/60* | (2013.01) |

(52) U.S. Cl.
CPC ............ *G06F 21/35* (2013.01); *G06F 1/1694* (2013.01); *G06F 3/017* (2013.01); *G06F 21/604* (2013.01); *G06F 2221/2151* (2013.01)

(58) Field of Classification Search
None
See application file for complete search history.

(56) References Cited

U.S. PATENT DOCUMENTS

| | | | |
|---|---|---|---|
| 7,236,156 B2 | 6/2007 | Liberty et al. | |
| 7,990,365 B2 | 8/2011 | Marvit et al. | |
| 8,130,134 B2 | 3/2012 | Meng et al. | |
| 8,285,344 B2 | 10/2012 | Kahn et al. | |
| 8,441,389 B2 | 5/2013 | Stefanik | |
| 8,516,561 B2 | 8/2013 | White et al. | |
| 8,593,576 B2 | 11/2013 | Friedman | |
| 8,665,075 B2 | 3/2014 | Pratt et al. | |
| 8,938,787 B2 | 1/2015 | Turgeman | |
| 8,949,070 B1 | 2/2015 | Kahn et al. | |
| 2002/0067350 A1 | 6/2002 | Ayed | |
| 2004/0148526 A1* | 7/2004 | Sands | G06F 21/32 726/5 |
| 2007/0046643 A1 | 3/2007 | Hillis et al. | |
| 2009/0017799 A1 | 1/2009 | Thorn | |
| 2009/0291759 A1* | 11/2009 | Cox | G06F 3/04883 463/37 |
| 2010/0042564 A1 | 2/2010 | Harrison et al. | |

(Continued)

FOREIGN PATENT DOCUMENTS

| | | |
|---|---|---|
| EP | 2538308 A2 | 12/2012 |
| WO | WO 2015052051 A1 | 4/2015 |

OTHER PUBLICATIONS

International Search Report and Written Opinion directed to International Patent Application No. PCT/US2016/065634, dated Feb. 27, 2017; 9 pages.

(Continued)

*Primary Examiner* — Joseph P Hirl
*Assistant Examiner* — Hassan Saadoun
(74) *Attorney, Agent, or Firm* — Sterne, Kessler, Goldstein & Fox P.L.L.C.

(57) ABSTRACT

Disclosed herein are embodiments for user identification based on the motion of a device. An embodiment operates by detecting a motion of a remote control. The detected motion is compared with one or more stored motions. A user ID corresponding to the motion based on the comparison is determined. Access to a system is provided based on the determined user ID.

19 Claims, 6 Drawing Sheets

(56) References Cited

U.S. PATENT DOCUMENTS

| | | | |
|---|---|---|---|
| 2010/0083373 A1* | 4/2010 | White | G06F 3/017 726/21 |
| 2010/0130228 A1* | 5/2010 | Vendrow | H04M 3/42348 455/456.1 |
| 2014/0184922 A1 | 7/2014 | Schafer et al. | |

OTHER PUBLICATIONS

Chang et al., "Inferring Identity Using Accelerometers in Television Remote Controls," Pervasive Computing, May 2009; pp. 151-167. Retrieved from the Internet at http://bkveton.com/docs/pervasive2009.pdf.

* cited by examiner

USER IDENTIFICATION BASED ON THE MOTION OF A DEVICE

BACKGROUND

Field

This disclosure is generally directed to the identification of a user based on the motion of a device.

Background

Systems that cater to user preferences or have specific user settings often require users to login to the system, particularly if the system is shared amongst a number of different users. In entertainment systems, a standard user login process using a remote control usually requires the user to type user identification information on a small remote control keyboard or use the remote control to direct an onscreen keyboard to enter the proper login information. In either scenario, logging in to the system, particularly when using a remote control, can be a cumbersome process.

SUMMARY

Provided herein are system, apparatus, article of manufacture, method and/or computer program product embodiments, and/or combinations and sub-combinations thereof, for user identification based on the motion of a device.

An embodiment includes a method for user identification based on the motion of a device. The method may operate by detecting a motion of a remote control. The detected motion may be compared with one or more stored motions associated with the remote control. A user ID corresponding to the motion is determined based on the comparison. Access to a system is provided based on the determined user ID.

Another embodiment includes another method for user identification based on the motion of a device. The method may operate by detecting a motion of a remote control. It is determined whether the motion corresponds to a user ID of a system. If the motion corresponds to the user ID of the system, the user ID is logged into the system. If the motion does not correspond to the user ID of the system, a new user ID may be requested, and an association between the detected motion and the new user ID may be built.

Another embodiment includes a system for user identification based on the motion of a device. The system may include a memory and at least one processor coupled to the memory. The system may be operable to detect a motion of a remote control. The detected motion may be compared with one or more stored motions associated with the remote control. A user ID corresponding to the motion is determined based on the comparison. Access to a system is provided based on the determined user ID.

Another embodiment includes another system for user identification based on the motion of a device. The system may include a memory and at least one processor coupled to the memory. The system may be operable to detect a motion of a remote control. The system may determine whether the motion corresponds to a user ID of a system. If the motion corresponds to the user ID of the system, the user ID is logged into the system. If the motion does not correspond to the user ID of the system, a new user ID may be requested, and an association between the detected motion and the new user ID may be built.

Further features and advantages of embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for user identification based on the motion of a device.

Figure 1:
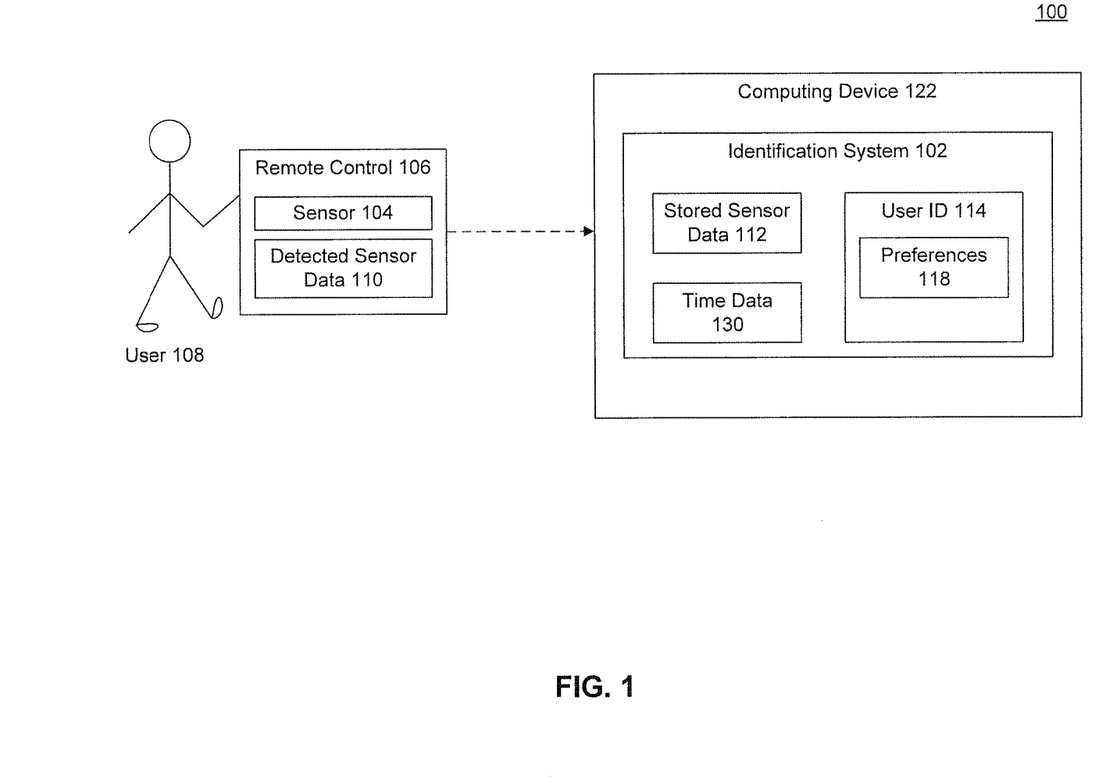
FIG. 1 is a block diagram of a system for user identification based on the motion of a device, according to an example embodiment.

FIG. 1 is a block diagram of a system 100 for user identification based on the motion or motions of a device, according to an example embodiment. An identification system 102 identifies users 108 based on how they handle and/or use a remote control 106. Identification system 102 may be contained in or operatively coupled to a computing device 122. Computing device 122 may be any device operated by remote control 106, where it is desirable to identify the user 108 who is using device 122. Non-limiting examples of device 122 include a cable box, streaming media player, computer, DVD player, stereo, or any other media player or computing device.

Based on the handling/use of the remote control (e.g., received or stored or otherwise represented as detected sensor data 110), the identification system 102 may identify a corresponding user ID 114 for logging into computing device 122. The user 108 may then be allowed to access or is otherwise provided access to computing device 122, and any system preferences 118 associated with the user ID 114 may be loaded to provide a customized user experience. The automatic user identification by identification system 102 saves the user 108 from the cumbersome task of trying to manually enter his/her user identification, passwords, or other authentication information using remote control 106 or other input device.

Different users 108 may handle and/or use remote control 106 differently. Example handling differences may include how users 108 pickup remote control 106 (e.g., speed and/or direction), how users 108 hold remote control 106 (e.g., parallel, perpendicular, or at a certain angle relative to the ground), how much time it takes users 108 to select buttons on remote control 106 (e.g., the rate at which users 108 press channel and volume buttons), or whether users 108 hold remote control 106 while watching TV (thereby resulting in motion of the remote control 106) or put remote control 106 on a stationary object (such as a table) while watching (thereby resulting in no motion of remote control 106). For example, two users 108 may pick up remote control 106 differently from a table or other surface upon which it may be resting. The differences could include speed and/or directional differences on holding, lifting, handling, or otherwise using remote control 106. These differences in how the users 108 are handling and using remote control 106 may be detected by one or more sensors 104 contained in or otherwise communicatively coupled to remote control 106.

In an embodiment, sensor(s) 104 may be one or more of an accelerometer, gyroscope, or other motion, location, orientation or speed sensing and/or detecting component. Sensor(s) 104 may detect or track a particular motion of remote control 106 when handled by one or more users 108. For example, remote control 106 may be laying on a table or couch. A first user 108 may pick up the remote control 106 in a particular way, or may use a particular motion that differs from how a second user 108 picks up the remote control 106. The first user 108, for example, may pick the remote control straight up off the surface upon which it was laying. The second user 108 may however slide the remote to the right a little bit before picking it up. While a third user 108 may pick up or lift remote control at a high rate of speed or velocity. Sensor(s) 104 may detect and/or differentiate between these different remote handling motions and/or speeds, and based on these differentiations identification system 102 may identify the corresponding users 108.

The motion detected by sensor(s) 104 may be stored as detected sensor data 110. Detected sensor data 110 may then be transmit or otherwise provided to identification system 102. Identification system 102 may compare detected sensor data 110 against stored sensor data 112 (if any). Stored sensor data 112 may include detected sensor data 110 that has been detected by remote control 106 and communicated to identification system 102. Such stored sensor data 112 may be established as corresponding to or otherwise associated with users 108 during a learning phase, as described below.

A user 108 may have a user ID 114 in identification system 102 to which their stored sensor data 112 corresponds. Then, for example, when identification system 102 receives detected sensor data 110, the detected sensor data 110 may be compared with the stored sensor data 112 to identify the user ID 114 corresponding to the user 108 handling or using remote control 106. The user 108 may then be granted or provided access to computing device 122 and/or preferences 118 associated with user ID 114 may be loaded into or by computing device 122. Providing access may involve communicating the identified user ID 114 and/or preferences 118 to computing device 122. In an embodiment, computing device 122 (or another system 123 as described below in greater detail with regard to FIG. 2) may have a subsequent login and/or authentication procedure prior to providing user 108 with access to the system 123 or computing device 122.

In an embodiment, identification system 102 may not have enough stored sensor data 112 to determine a match with detected sensor data 110. This may occur, for example, when a new user 108 uses remote control 106. This may also occur when an existing user 108 wishes to further program identification system 102 so it is more accurately able to identify his/her identity when using remote control 106. For example, identification system 102 may enter a learning phase during which it learns (e.g., detects, records and stores) detected sensor data 110 and associates it with a particular user 108 and his corresponding user ID 114. This learning phase may occur over time as a user 108 logs into and uses system 122 via remote control 106. Or, for example, the learning phase may be purposely performed during a specific period of time during which the user 108 is prompted to repeatedly perform one or more motions until a requisite amount of sensor data 112 has been stored or captured to enable identification system 102 to accurately identify user 108 through his use of remote control 106. The learning process may be performed for each, any, or all users 108 who use remote control 106. In this manner, identification system 102 may build or establish an association between various motions (e.g., detected sensor data 110) and different users 108 (and their corresponding user IDs 114) who use remote control 106.

In an embodiment, during the learning phase, the user 108 may be prompted to enter his/her user ID, password, or other login information as they would normally do using remote control 106 or another system. For example, user 108 may type information on remote control 106, or use remote control 106 to direct an on-screen keyboard that may be displayed on a television or other monitor. Upon receipt of the user ID 114 or other login information, identification system 102 would build an association between the detected sensor data 110 and the user ID 114 corresponding to the user 108, and store this association with stored sensor data 112.

In an embodiment, identification system 102 may continually be learning the relative motions (detected sensor data 110) of one or more users 108. Though a given user 108 may handle remote control 106 in a particular manner, the motion (e.g., direction, speed, and/or timing) of the handling of remote control 106 may vary over time. For example, a given user 108 may not hold remote control 106 at the same height or same orientation relative to the floor or computing device 122 every time. Instead, there may be variances in speed, direction, orientation, timing, and/or other movement through space for a given user 108. Thus, in an embodiment, during the learning phase, the identification system 102 gathers and stores stored sensor data 112 that represents a range of motions corresponding to each of the users 108 of the remote control 106.

Accordingly, identification system 102 may track these variances in remote control 106 handling, and still be able identify the user 108 associated with the detected sensor data 110 even if the detected sensor data 110 is not the exact same each time, but falls within a particular variance threshold. The degree of allowable variance may be determined based on the volume of previously stored sensor data 112 associated with a particular user ID 114, the number of user IDs 114 registered with system 102, or any other number of factors.

A user 108 who is trying to pick up or otherwise handle remote control 106 may accidentally drop the remote control 106. This may create a large, unusual spike in the detected sensor data 110. In an embodiment, such unusual spikes may be discarded and not stored as part of the stored sensor data 112.

In an embodiment, identification system 102 may identify user 108 based on detected sensor data 110, but may nonetheless prompt the user 108 for confirmation or acknowledgement that the correct user ID 114 has been selected. Or, in an embodiment, user 108 may be required to provide an alpha-numeric passcode or motion password corresponding to the identified user ID 114 when identification system 102 is not certain it has identified the correct user 108 through motion analysis.

Accordingly, stored sensor data 112 may act as signatures for different users 108, enabling identification system 102 to identify the user ID 114 corresponding to the detected motion 110 made by the user 108 who is currently using remote control 106. In an embodiment, user 108 may purposely create his/her own signature motion (e.g., stored sensor data 112) using remote control 106. For example, user 108 may activate a button on remote control 106 and waive remote control 106 in the air to signify a particular letter, shape, or other symbol by which to identify user 108. This motion in space (e.g., direction, velocity, timing, shape) may be saved as stored sensor data 112 and associated with the corresponding user ID 114. For example, a user 108 named "Jason" may use remote control 106 to make the letter "J" or a triangle in the air as his signature motion. This detected sensor data 110 may then be stored in identification system 102 and associated with Jason's user ID 114. In an embodiment, user 108 may be asked to repeat the motion a threshold number of times or until the stored sensor data 112 is sufficiently similar to identify the motion as being associated with the same user ID 114.

Then for example, when next handling remote control 106, Jason may draw the letter "J" in the air to identify himself to identification system 102. In an embodiment, and continuing this non-limiting example, prior to drawing the "J" in the air, the user Jason 108 may need to activate a particular signature identifier feature of identification system 102. In an embodiment, this and other features may be activated by pressing one or more buttons on remote control 106. When this feature is activated, remote control 106 may begin detecting detected sensor data 112 for comparison by identification system 102 to stored sensor data 112.

As discussed above, remote control 106 uses one or more of accelerometers, gyroscopes, or other motion, location, orientation, or speed sensing and/or detecting components as sensors 104 to detect motion. In an embodiment, other sensors 104 may be used. For example, other sensors 104 may detect and measure heartbeat, fingerprint, heat, respiration, GPS (geospatial positioning), or other data. Combinations of data from different sensors 104 may be used for data 110, 112.

In an embodiment, time data 130 may be used to identify user 108 as well. Time data 130 may include any time component that may be relevant to identifying which user 108 is handling remote control 106. For example, time data 130 may be the time between when sensor 104 first detects motion of remote control 106 from a stationary or resting state and when user 108 activates a button on remote control 106. This time delay may vary among users; some users 108 may select a button very quickly, while others select buttons much more slowly. Or, it may be the time from when the user identification function is otherwise activated and a subsequent button or option is selected.

Another example of time data 130 may include a timestamp associated with the motion. For example, different users 108 may have different schedules of when they use or generally use computing device 122. Identification system 102 may use time data 130 to identify a user 108, or decide between two users 108 with similar stored sensor data 112, based on the time of day that computing device 122 is being accessed by user 108.

Stored sensor data 112 may include data that is detected when remote control 106 is picked up, used, or during a time interval after an identification feature is activated. In an embodiment, stored sensor data 112 may continue to track how remote control 106 is used/handled even after identification has completed. This additional sensor information 110 may be used to augment stored sensor data 112 and may be used by identification system 102 to more accurately determine sensed differences between two or more users 108. Or, for example, this information may be used to periodically verify which user 108 is handling remote control 106. For example, over a given period of time two or more users 108 may each periodically handle remote control 106, identification system 102 may determine when remote control 106 by each user 108 based on automatic determination based on their remote handling techniques (e.g. detected sensor data 110) or by activation of a user identification feature when remote control 106 is passed between users 108.

Figure 2:
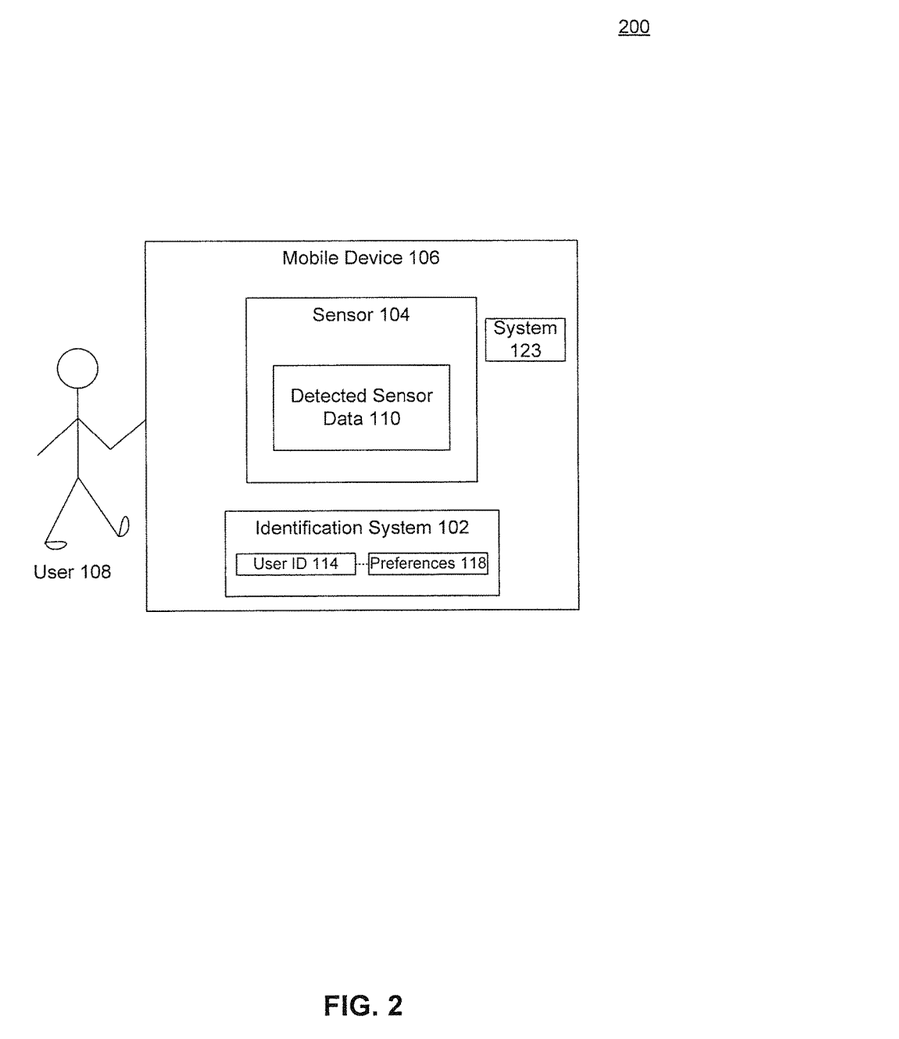
FIG. 2 is a block diagram of a system for user identification based on the motion of a device, according to another example embodiment.

FIG. 2 is a block diagram of a system 200 for user identification based on the motion of a device, according to another example embodiment. Identification system 102 identifies users 108 based on how they handle and/or use a mobile device 106.

Mobile device 106 may be any device that is mobile or portable and operable by a user 108. Mobile device 106 may be a device that a user 108 holds in his hands and/or lap when operating. Mobile device 106 may include, for example, a mobile phone, laptop, mobile media player (such as DVD, streaming player, music player), camera (including both video and still image), or any other device that may include or otherwise receive information from one or more sensors 104.

Identification system 102 may operate similar to identification 102 as described above with respect to FIG. 1. However, mobile device 106 may be a self-contained unit that includes sensor(s) 104 and identification system 102. Mobile device 106 may use motion or other detected sensor data 110 to identify a user, receive a password or other authentication information, or otherwise use detected sensor data 110 to perform any different number of functions or operations. Mobile device 106 may include or otherwise be in communication with a system 123 to which a user 108 seeks access. System 123 may be any software system, such as an operating system, app, website, or other program.

In an embodiment, mobile device 106 may also be a remote control. However, rather than providing detected sensor data 110 to another device (e.g., computing device 122 in FIG. 1), mobile device 106 may locally perform user identification functions. Then, for example, the identified user ID 114 may be provided to another device (such as computing device 122), or to a system 123 (such as a website or server over the Internet) to perform one or more operations associated with the user 108 corresponding to the identified user ID 114.

In an embodiment, identification system 102 may reside on a server or group of servers (such as in a cloud computing environment) and may be communicatively coupled (wired or wirelessly) with mobile device 106 directly or indirectly via, for example, local computing device 122. Then, for example, when detected sensor data 110 is detected or received, the data 110 may be uploaded to the server. The server may then store the uploaded data 110 as stored sensor data 112 and may be associated with a user ID 114. Or, if there is sufficient stored sensor data 112 to determine a match, the matched user ID 114 and/or preferences 118 may be communicated back to the mobile device 106 (or computing device 122 as shown in FIG. 1).

This embodiment of identification system 102 residing or operating, at least in part, across one or more servers may provide additional computing, processing, and storage that may not be available on a local computing device 122 or mobile device 106. This may allow for faster or more powerful processing, and more effective and accurate identification of user 108.

In an embodiment, identification system 102 (wherever it resides, either local to user 108 or across one or more servers) may take advantage of machine learning or feature extraction technologies to identify user behaviors over time, and to match those behaviors to one or more users. For example, identification system 102 may identify user behavior, usage patterns, or similarities across different users operating different remote controls 106 in conjunction with different computing devices 122, mobile devices 106, and across a wide range of different users. These crowd-sourced usage patterns may be abstracted to determine when a user is performing particular actions with regard to the remote control.

For example, some users may spin the remote controls in their hands while watching television or consuming other content, which may result in particular patterns of detected sensor data 110. This usage pattern may be identified by identification system 102. In an embodiment, identification system 102 may then perform some action with regard to the determined motion or usage by the user, such as displaying a message on a monitor. Identification system 102 may also utilize crowd-sourced information for any other number of different purposes, either system or user specified.

Identification system 102 is not limited to user identification. In an embodiment, based on detected sensor data 110, identification system 102 may identify one or more operations to perform. For example, a first user 108 may create a profile or preferences 118 that include a left motion (as detected by sensor 104) indicating a channel up operation, while a right motion indicates a channel down operation. A second user 108 however may reverse the two motions such that a left motion indicates channel down while a right motion indicates channel up. A third user 108 may use up and down motions for channel, volume, or other operations. In an embodiment, one or more preferences 118 may be stored by system 123 alternatively or in addition to the storage of one or more preferences 118 by identification system 102.

Thus, each user 108 may configure operations of mobile device 106 (including system 123) and/or another device (such as computing device 122) with which mobile device 106 is in communication, based on detected sensor data 110. Then, for example, based on which user 108 is currently identified as using mobile device 106, the system 122 may respond accordingly and perform the operation associated with the detected motion.

Figure 3:
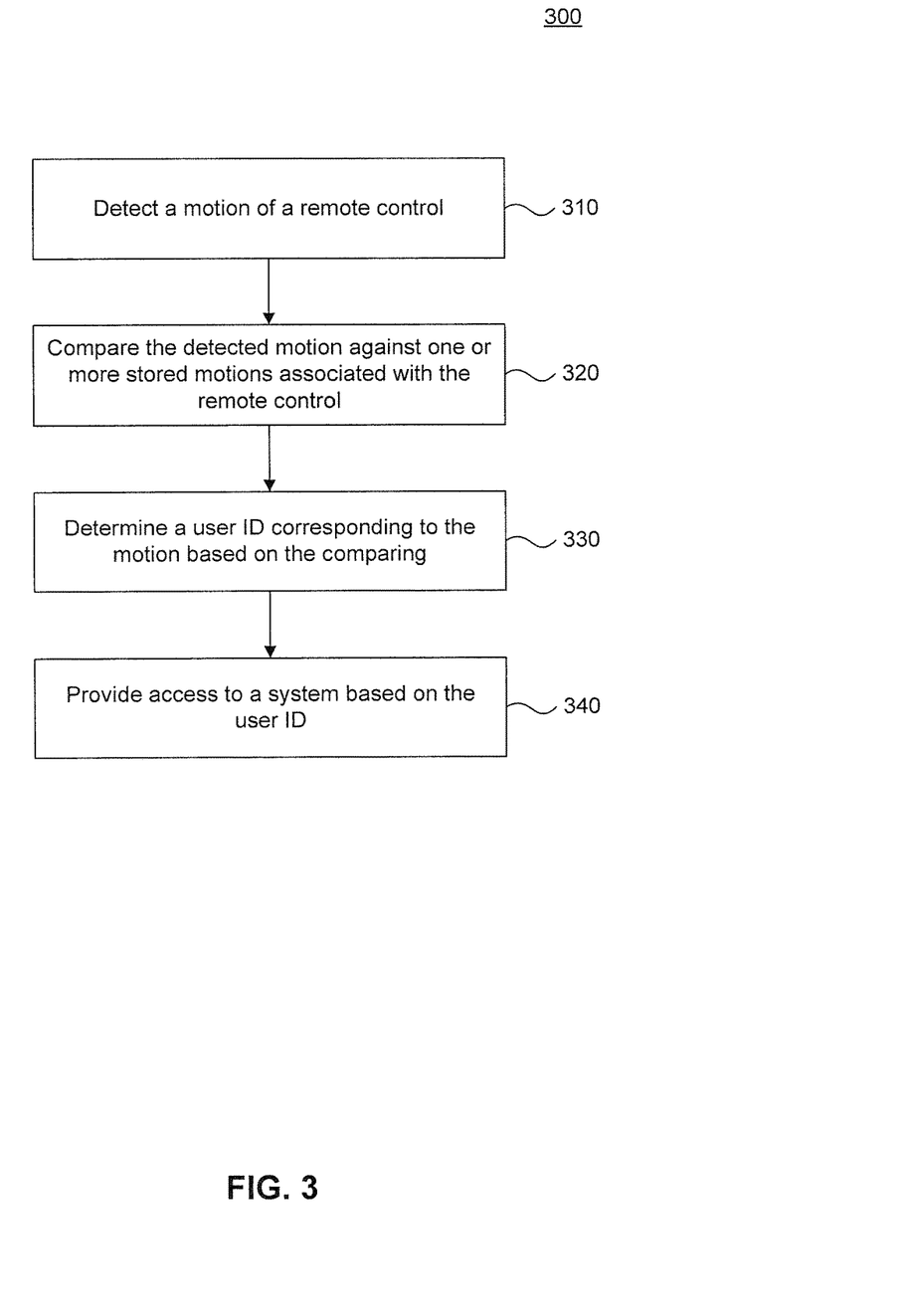
FIG. 3 is a flowchart for a method for user identification based on the motion of a device, according to an embodiment.

FIG. 3 is a flowchart 300 for a method for user identification based on the motion of a device, according to an embodiment.

In step 310, a motion of a remote control is detected. For example, identification system 102 may detect a motion of remote control 106 based upon the receipt of detected sensor data 110. In an embodiment, the detection of motion may be in reference to a previous determination that remote control 106 was stationary or in static sensor state. The detected sensor data 110 that is detected after the stationary state may then be used to identify a user 108/user ID 114 or other stored operation. Or, for example, a particular function on remote control 106 may be selected that requests a user or action-performance (e.g., channel up/down) identification based on detected motion or other sensor data 110.

In step 320, the detected motion is compared against one or more stored motions associated with the remote control. For example, identification system 102 may compare the received detected sensor data 110 with or against stored sensor data 112 to determine if a match to one or more user IDs 114 can be determined. In an embodiment, if multiple user IDs 114 include similar stored sensor data 112, then time data 130 may be used to differentiate among users 108. The time data 130 may include a time of use, time of motion, or time between motion and a button selection on remote control 106. In an embodiment, a user 108 may be prompted to perform or repeat an identifying motion (e.g., to confirm or identify a user 108 or other operation). In an embodiment, the detection may be used to determine which action (e.g., channel change, volume adjustment, system reboot, page forward/backward, etc.) to take in response to the detected sensor data 110 motion.

In step 330, based on the comparison performed in step 320, a user ID 114 corresponding to the motion is determined. For example, based on a comparison of sensor data 110 and 112 (and optionally time data 130) one or more user IDs 114 may be identified as corresponding to user 108. In an embodiment, if multiple user IDs 114 are identified, user 108 may be prompted to select, identify, or acknowledge which user ID 114 corresponds to user 108. Or, for example, user 108 may be prompted to enter an alphanumeric or motion password using remote control 106 to confirm the identity.

In step 340, access to a system based on the user ID is provided. For example, once user ID 114 has been identified and authenticated, user 108 may be allowed to access a system 122. This may involve identification system 122 communicating or transmitting the user ID 114 and/or preferences 118 associated with user ID 114 to another system 122. Alternatively, computing device 122 or system 123 may use the user ID 114 to identify and load preferences 118 associated with user 108 corresponding to the user ID 114. Such preferences 118 may include video and audio preferences, favorite channels, content not available to other users 108 (such as premium pay channels), etc. In an embodiment, if user 108 already has access to system 123 or device 122 or has already been identified, the detected motions may cause system 123 or device 122 to perform one or more actions associated with the detected motion corresponding to the user ID 114.

Figure 4:
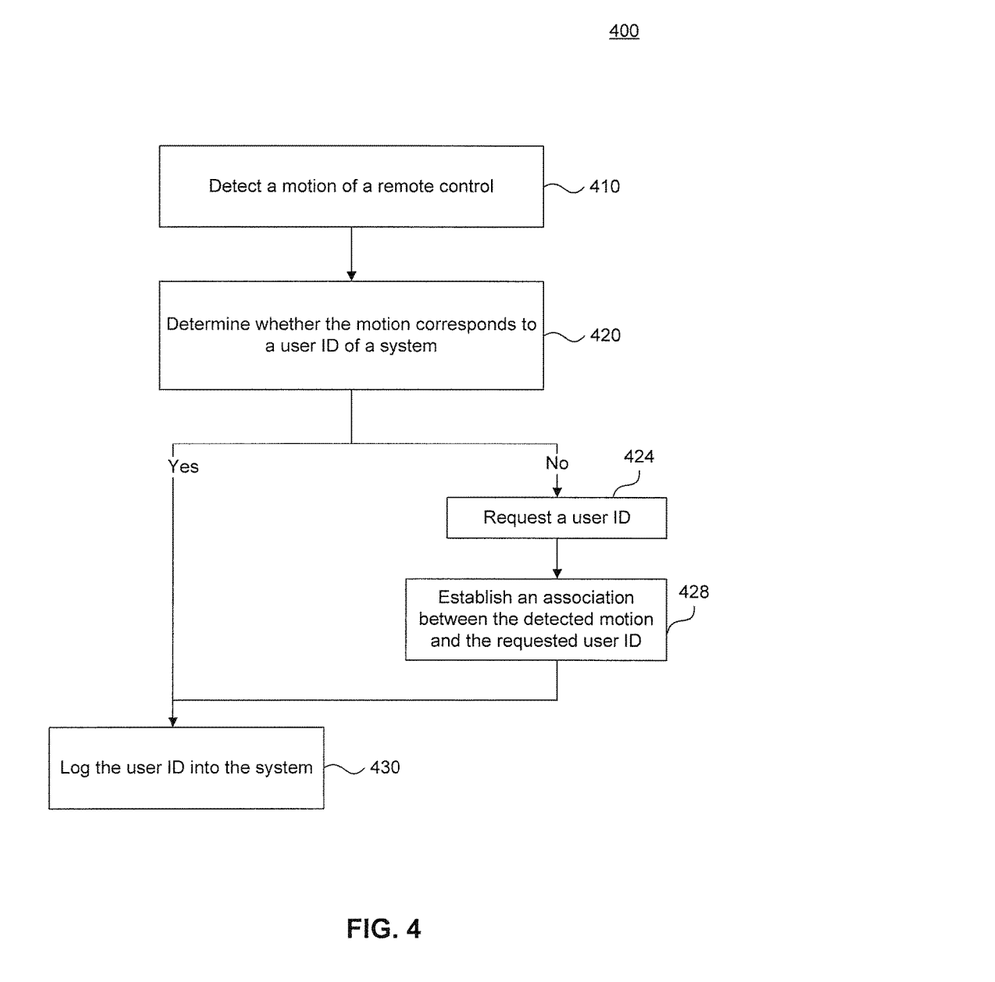
FIG. 4 is a flowchart for a method for user identification based on the motion of a device, according to another example embodiment.

FIG. 4 is a flowchart 400 for a method for user identification based on the motion of a device, according to another embodiment.

In step 410, a motion of a remote control is detected. For example, identification system 102 may include or be communicatively coupled to a sensor(s) 104 that can detect motion or other sensor data 110 of a user 108. The motion data may include speed, direction, and/or time data related to the motion, and may also include data from one or more other biometric sensors 104.

In step 420, it is determined whether the motion corresponds to a user ID of a system. For example, identification system 102 may compare the detected sensor data 110 (received from remote control 106) to stored sensor data 112 to determine if a match can be identified. In an embodiment, there may be variances in detected sensor data 110 and stored sensor data 112. Identification system 102 may determine whether the variances fall within a determined error threshold to determine if a match exists.

In step 424, if the motion does not correspond to a user ID, a user ID is requested. For example, identification system 102 may request that the user 108 who is currently using remote control 106 enter a user ID 114. The entered user ID 114 may be for a new user 108 who is using the remote control 106 and/or system 122 for the first time. Or the entered user ID 114 may be for an existing user, for which the detected sensor data 110 is added to the existing stored sensor data 112 to create a more complete motion or sensor profile for the user 108.

In step 428, an association between the detected motion and the requested user ID is established. For example, once the user 108 enters the user ID 114, identification system 102 may seek to obtain more detected sensor data 110 for user 108 (or use the already detected sensor data 110) to augment the stored sensor data 112. This learning process includes adding the detected sensor data 110 with the user ID 114 to the stored sensor data 112. In an embodiment, a user 108 may need to login or provide a minimum set of detected sensor data 110 for identification system 102 to be able to subsequently detect user ID 114 with greater accuracy.

In step 430, the user ID is logged into the system. For example, once the user ID 114 is determined or authenticated, user 108 is allowed to access computing device 122, or system preferences 118 for the user 108 may be loaded into computing device 122.

Figure 5:
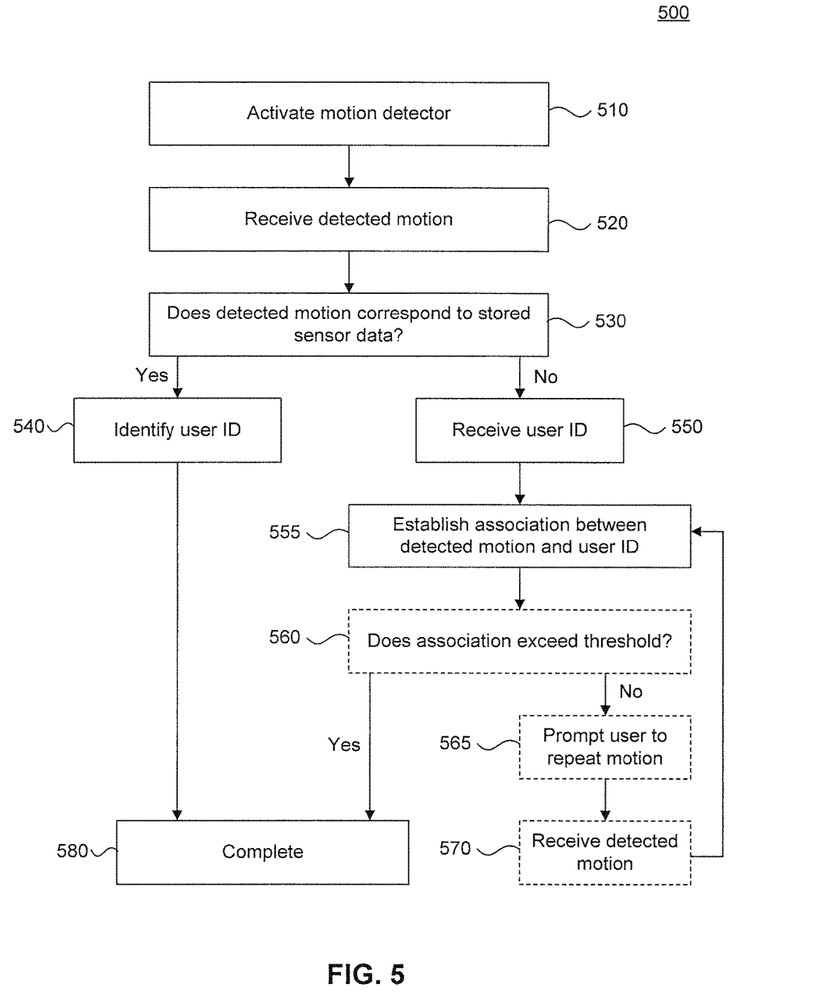
FIG. 5 is a flowchart for a method for user identification based on the motion of a device, according to another example embodiment.

FIG. 5 is a flowchart 500 for a method for user identification based on the motion of a device, according to another embodiment.

In step 510, motion detection is activated. For example, the motion detection may be activated based on a determination that remote control 106 has moved from a previous stationary or static state, or upon the activation of a motion detection, learning phase, or signature detection functionality. For example, user 108 may activate a signature detection functionality to signal identification system 102 the user intends to provide a motion and/or establish a signature motion for logging into or otherwise operating computing device 122 or system 123.

In step 520, detected motion is received. For example, sensors 104 may detect one or more motions performed by user 108 over a specified time interval, until a motion of remote control 106 is determined to have completed or stopped, or until a signature or motion complete indication is received from user 108 (e.g., via remote control 106).

In step 530, it is determined whether the detected motion corresponds to stored sensor data. For example, identification system 102 may compare detected sensor data 110 with or against stored sensor data 112 to determine if a match can be identified.

In step 540, a user ID is identified. For example, in step 530, if a match is determined between detected sensor data 110 and stored sensor data 112, then the corresponding user ID 114 is identified.

In step 550, a user ID is received. For example, in step 540, if a match is not or cannot otherwise be determined between detected sensor data 110 and stored sensor data 112, then identification system 102 may prompt user 108 to enter his/her user ID 114. User 108 may enter user ID 114 using an onscreen or remote-control 106 based keyboard, or select from a number of different user IDs 114 provided via an interface. In another embodiment, user 108 may be prompted to repeat the motion.

In step 555, an association is established between the detected motion and user ID. For example, identification system 102 may store the detected sensor data 110 in a database or other storage device, as stored sensor data 112 and create an association with the received user ID 114. If identification system 102 already has stored sensor data 112 corresponding to the received user ID 114, then identification system 102 may build or further strengthen the association between motions and the user ID 114.

In step 560, it is determined whether the association exceeds a threshold. For example, in a learning phase, identification system 102 may determine whether a requisite number of motions have been stored (e.g., as stored sensor data 112) to identify user ID 114 based on a detected motion. Or, for example, identification system 102 may determine whether it is able to differentiate the stored sensor data 112 motions associated with the received user ID 114, from other stored sensor data 112 associated with different user IDs 114. These or other threshold indicators may be used by identification system 102 during a learning phase.

In step 565, the user may be prompted to repeat the motion. For example, if user 108 is trying to establish a signature motion (to login or otherwise operate device 122 or system 123) or prefers to avoid having to enter his/her user ID again, then identification system 102 may prompt user 108 to enter one or more motions until the threshold for identification (e.g., step 555) has been reached.

In step 570, the detected motion is received. For example, identification system 102 may receive additional detected sensor data 110. This detected sensor data 110 may then be stored and used to establish or build a stronger association between the stored sensor data 112 (e.g., motion data) and user ID 114.

In an embodiment, any of steps 560, 565, and 570 may be optional or part of a learning phase. In another embodiment, identification system 102 may establish the association between detected motions and user ID 114 over time without specific prompts to user 108 to enter any particular motion(s). For example, as described above, identification system 102 may receive motion data corresponding to how user 108 ordinarily handles or uses remote control 106.

In step 580, the process completes. For example, identification system 102 may provide the user ID 114 and/or preferences 118 to device 122 or system 123. Or, for example, identification system 102 may prompt user 108 to confirm the identified user ID 114, and/or enter a password or subsequent motion to gain access device 122 or system 123.

Figure 6:
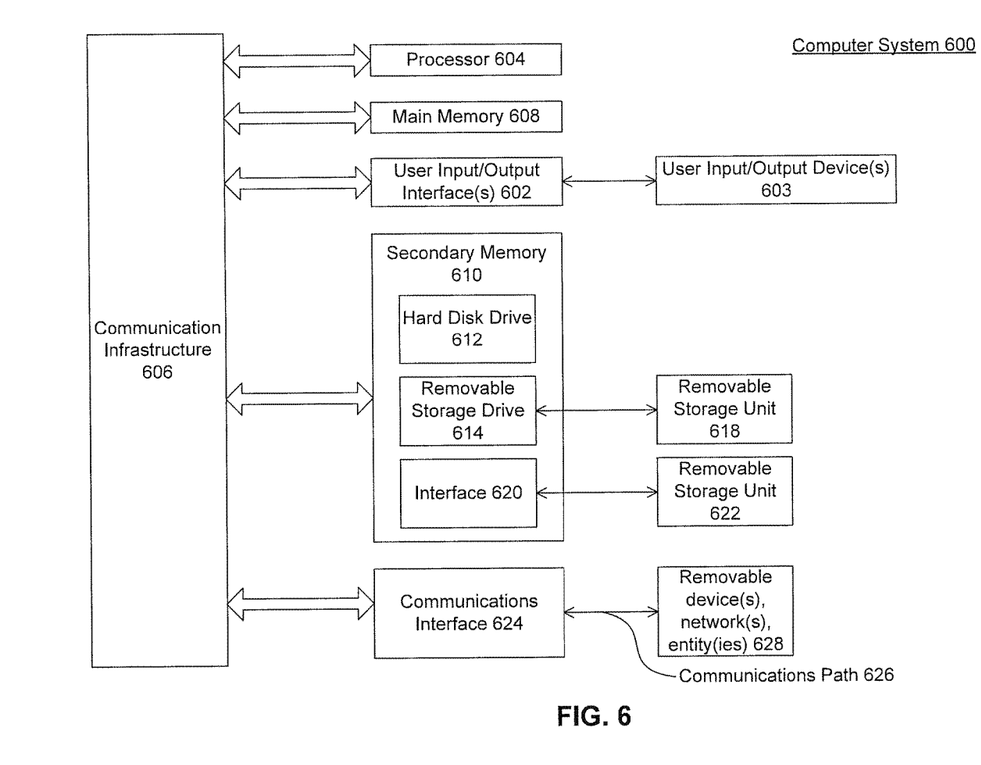
FIG. 6 is an example computer system useful for implementing various embodiments.

Various embodiments can be implemented, for example, using one or more well-known computer systems, such as computer system 600 shown in FIG. 6. For example, identification system 102 may be implemented using one or more computer systems 600 (as part of or operatively coupled with computing device 122). Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:
   detecting a motion of a remote control;
   determining that the motion is associated with a first user ID and a second user ID;
   determining a timestamp associated with the motion;
   comparing the timestamp of the motion to a first time period corresponding to usage of a user associated with the first user ID, and to a second time period corresponding to usage of a user associated with the second user ID, wherein the first time period at least partially differs from the second time period;
   determining that the motion corresponds to the first user ID based on the timestamp being within the first time period;
   requesting a confirmation that the determined first user ID corresponds to a user associated with the detected motion; and providing access to a system based on at least the determined first user ID,
wherein at least the detecting, comparing, and providing are performed by one or more computer processors.

2. The method of claim 1, wherein the detecting comprises:
determining that prior to detecting the motion, the remote control was in a stationary state.

3. The method of claim 1, wherein the confirmation comprises:
receiving, responsive to the requesting of the confirmation, a motion password confirming the determined first user ID.

4. The method of claim 1, wherein the detecting comprises:
detecting the motion of the remote control based on readings provided by one or more accelerometers within the remote control.

5. The method of claim 1, wherein the detecting comprises:
receiving an indication of a selection from the remote control; and
determining a time between a first movement of the remote control from a stationary state and the receipt of the indication.

6. The method of claim 1, wherein the providing access comprises:
configuring the system with one or more preferences associated with a user corresponding to the first user ID.

7. A computer implemented method, comprising:
detecting a motion of a remote control;
determining that the motion is associated with a first user ID and a second user ID;
determining a timestamp associated with the motion;
comparing the timestamp associated with the motion and both the first user ID and the second user ID to a schedule of access corresponding to both the first user ID and the second user ID, wherein a first one of user IDs corresponds to usage during a first time period, and wherein a second one of the user IDs corresponds to usage during a second time period different from the first time period;
determining that the motion corresponds to the first user ID based on the timestamp being within the first time period;
requesting a confirmation that the determined first user ID corresponds to a user currently using the remote control, wherein the confirmation comprises one of the subsequent motion or input received from the remote control;
wherein if the motion corresponds to the first user ID associated with a system,
configuring the system with one or more preferences associated with a user corresponding to the user first ID; and
wherein if the motion does not correspond to the first user ID associated with the system,
requesting a new user ID, and
establishing an association between the detected motion and the new user ID;
wherein at least the detecting, configuring, requesting, and establishing are performed by one or more computer processors.

8. The method of claim 7, wherein the detecting comprises:
determining that prior to detecting the motion, the remote control was in a stationary state.

9. The method of claim 7, wherein the determining comprises:
comparing the detected motion to one or more stored motions, wherein at least one of the stored motions corresponds to the first user ID of the system.

10. The method of claim 7, wherein the detecting comprises:
detecting the motion of the remote control based on readings provided by one or more accelerometers within the remote control.

11. The method of claim 7, wherein the detecting comprises:
receiving an indication of a selection from the remote control; and
determining a time between a first movement of the remote control from a stationary state and the receipt of the indication.

12. A system, comprising:
a memory; and
at least one processor coupled to the memory and configured to:
detect a motion of a remote control;
determine that the motion is associated with a first user ID and a second user ID;
determine a timestamp associated with the motion;
compare the timestamp associated with the motion and both the first user ID and the second user ID to a schedule of access corresponding to both the first user ID and the second user ID, wherein a first one of user IDs corresponds to usage during a first time period, and wherein a second one of the user IDs corresponds to usage during a second time period different from the first time period;
determine that the motion corresponds to the first user ID based on the timestamp being within the first time period;
request a confirmation that the determined first user ID corresponds to the user currently using the remote control; and
provide access to a system based on at least the determined first user ID.

13. The system of claim 12, wherein the processor configured to detect is configured to:
determine that prior to the detection of the motion, the remote control was in a stationary state.

14. The system of claim 12, wherein the processor is further configured to:
receive, responsive to the request, a motion password confirming the determined first user ID.

15. The system of claim 12, wherein the processor configured to detect is configured to:
detect the motion of the remote control based on the readings provided by one or more accelerometers within the remote control.

16. The system of claim 12, wherein the processor configured to detect is configured to:
receive an indication of a selection from the remote control; and
determine a time between a first movement of the remote control from a stationary state and the receipt of the indication.

17. A system, comprising:
a memory; and
at least one processor coupled to the memory and configured to:

detect a motion of a remote control;
determine that the motion is associated with a first user ID and a second user ID;
determine a timestamp associated with the motion;
compare the timestamp of the motion to a first time period corresponding to usage of a user associated with the first user ID, and to a second time period corresponding to usage of a user associated with the second user ID, wherein the first time period at least partially differs from the second time period;
determine that the motion corresponds to the first user ID based on the timestamp being within the first time period;
request a confirmation from a user that the determined first user ID corresponds to the user associated with the detected motion;
wherein if the motion corresponds to the first user ID associated with the system,
configure the system with one or more preferences associated with a user corresponding to the first user ID; and
wherein if the motion does not correspond to the first user ID associated with the system,
request a new user ID, and
establish an association between the detected motion and the new user ID.

18. A tangible computer-readable device having instructions stored thereon that, when executed by at least one computing device, causes the at least one computing device to perform operations comprising:
detecting a motion of a remote control;
determining that the motion is associated with a first user ID and a second user ID;
determining a timestamp associated with the motion;
comparing the timestamp associated with the motion and both the first user ID and the second user ID to a schedule of access corresponding to both the first user ID and the second user ID, wherein a first one of user IDs corresponds to usage during a first time period, and wherein a second one of the user IDs corresponds to usage during a second time period different from the first time period;
determining that the motion corresponds to the first user ID based on the timestamp being within the first time period;
requesting a subsequent confirmation from the user that the determined first user ID corresponds to the user associated with the detected motion; and
providing access to a system based on the determined first user ID.

19. A tangible computer-readable device having instructions stored thereon that, when executed by at least one computing device, causes the at least one computing device to perform operations comprising:
detecting a motion of a remote control;
determining that the motion is associated with a first user ID and a second user ID;
determining a timestamp associated with the motion;
comparing the timestamp of the motion to a first time period corresponding to usage of a user associated with the first user ID, and to a second time period corresponding to usage of a user associated with the second user ID, wherein the first time period at least partially differs from the second time period;
determining that the motion corresponds to the first user ID based on the timestamp being within the first time period;
requesting an acknowledgement from the user that the determined first user ID corresponds to the user associated with the detected motion, wherein the acknowledgment includes receiving a passcode corresponding to the determined first user ID;
wherein if the motion corresponds to the first user ID associated with the system,
configuring the system with one or more preferences associated with a user corresponding to the first user ID; and
wherein if the motion does not correspond to the first user ID associated with a system,
requesting a new user ID, and
establishing an association between the detected motion and the new user ID.

* * * * *